May 5, 1964  L. T. ELLIOTT ETAL  3,131,714
AUTOMATIC CONTROL SYSTEM
Original Filed April 30, 1956  6 Sheets-Sheet 1
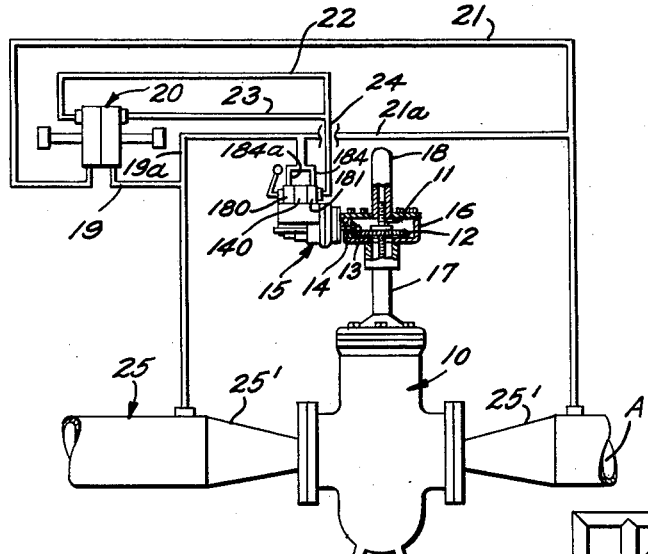
FIG.1.
FIG.11.
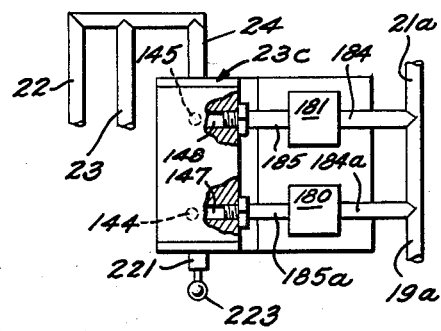
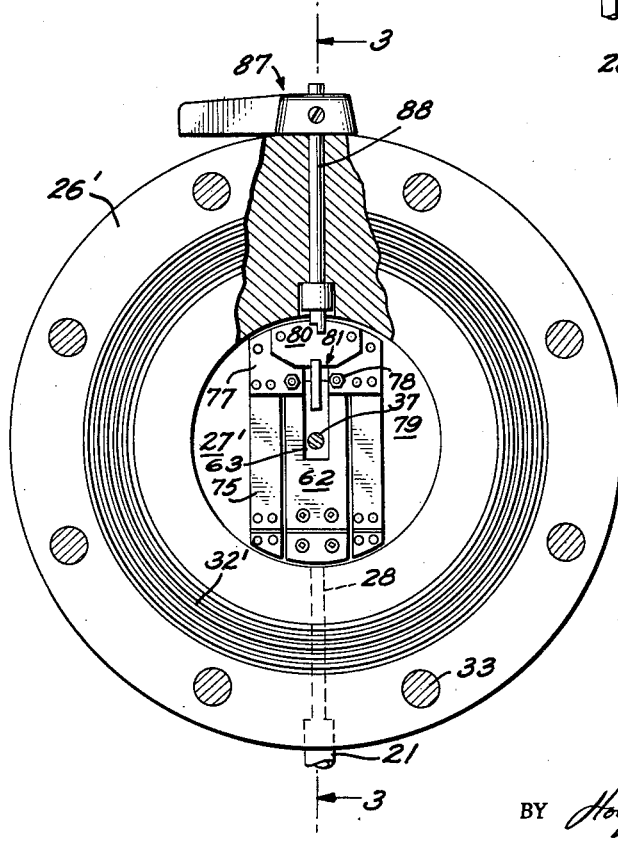
FIG.2.
INVENTORS
Lynn T. Elliott
Ronald G. Hune
BY Hooper, Leonard & Buell
their ATTORNEYS

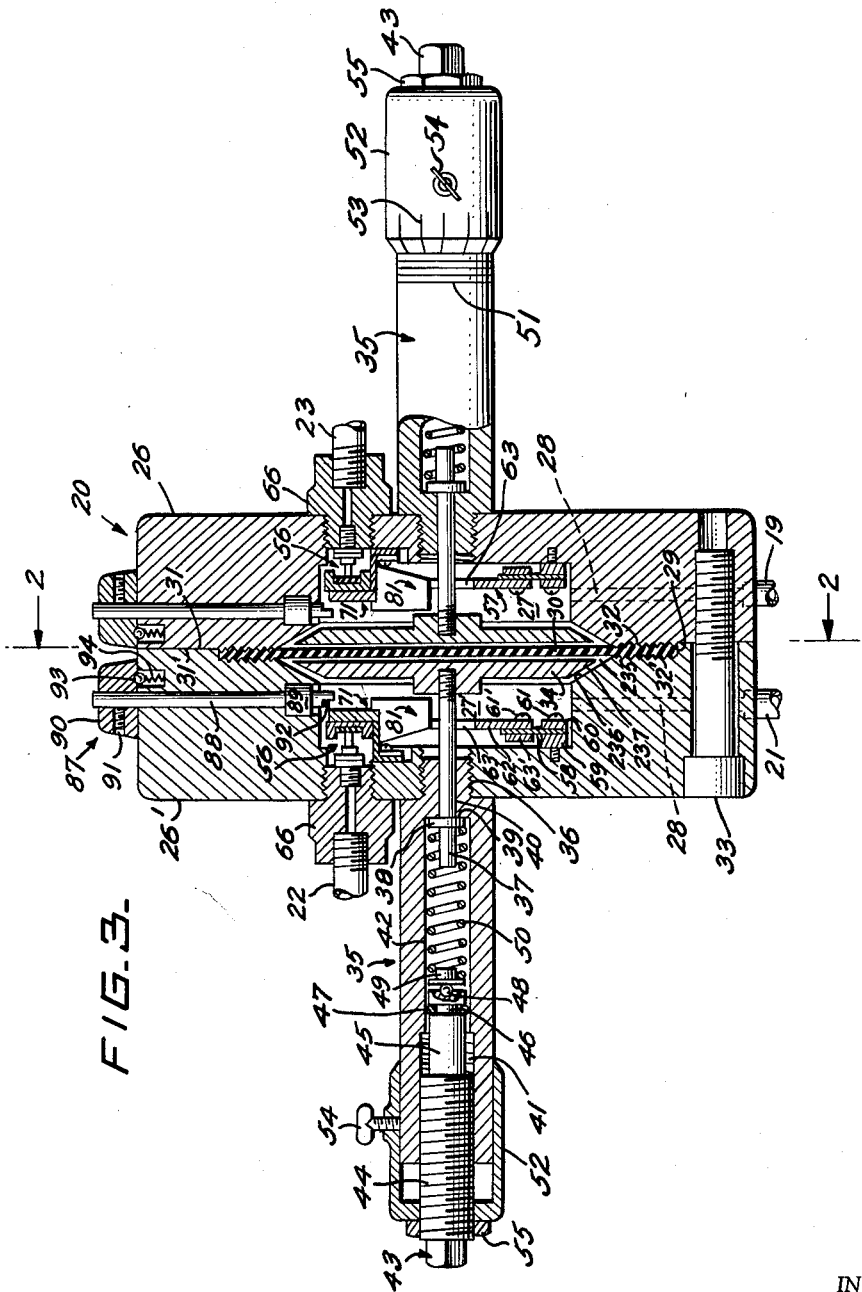

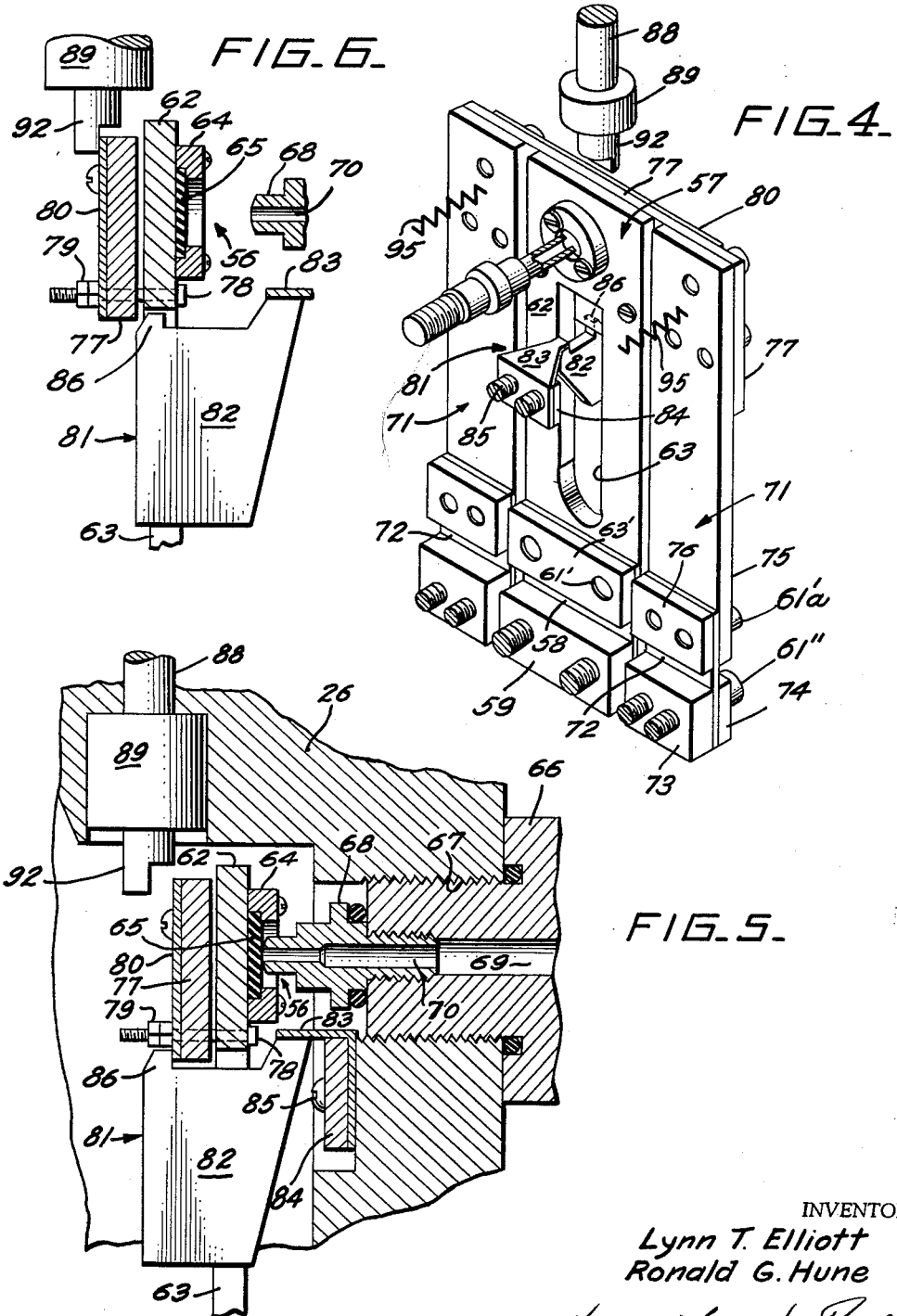

May 5, 1964

L. T. ELLIOTT ETAL 3,131,714

AUTOMATIC CONTROL SYSTEM

Original Filed April 30, 1956

INVENTORS
Lynn T. Elliott
Ronald G. Hune

BY *Hooper, Leonard & Buell*

*Theis* ATTORNEYS

May 5, 1964    L. T. ELLIOTT ETAL    3,131,714
AUTOMATIC CONTROL SYSTEM
Original Filed April 30, 1956    6 Sheets-Sheet 5

INVENTORS
Lynn T. Elliott
Ronald G. Hune
BY *Hooper, Leonard & Snell*
*Theis* ATTORNEYS

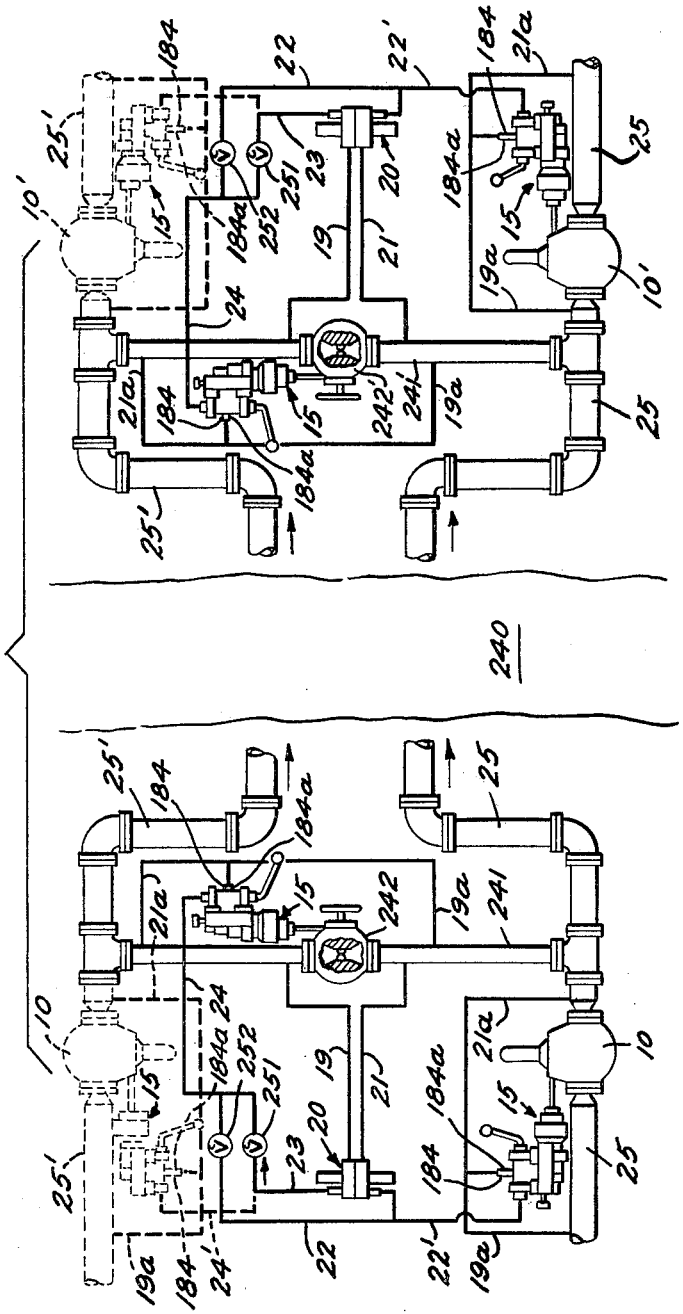

United States Patent Office 3,131,714
Patented May 5, 1964

3,131,714
AUTOMATIC CONTROL SYSTEM
Lynn T. Elliott, 371 M & M Bldg., Houston 2, Tex., and Ronald G. Hune, Houston, Tex.; said Hune assignor to E-I-M Company, Incorporated, Houston, Tex., a corporation of Texas
Continuation of abandoned application Ser. No. 581,706, Apr. 30, 1956. This application Nov. 18, 1960, Ser. No. 70,184
30 Claims. (Cl. 137—460)

This invention relates to novel automatic control means rapidly responsive to abnormal pressure drops. More particularly, this invention pertains to new means speedily responsive to abnormal pressure differentials such, e.g., as those created by a break in a pipeline or the like and capable of being used to actuate a valve operator to shut off flow in such a pipeline or the like.

The occurrence of breaks in pipelines, including those used to transport fuel gas at relatively high pressure, often causes serious loss of material being transported and of equipment. In more settled areas, or near industrial plants, such breaks may involve substantial fire and explosion hazards. Many such pipelines are relatively long and pass through places either somewhat inaccessible or locations which may be but infrequently visited. Moreover, it is not always easy to locate pipeline trouble even in the case of a break therein which augments the consequent loss which occurs. As a result, efforts have heretofore been made to stop the flow of material through a line when a break occurred. In some cases, any correction has been relatively slow due to the time lag occurring before any sensing of such a break took place. In some prior practices, various items of equipment have been required resulting in somewhat intricate or complicated arrangements. In other situations, parts used have been vulnerable to higher pressures often present in such lines and have required pressure regulation or reduction, thereby creating further problems.

Such deficiencies of prior practices are overcome by the new construction of this invention. In this invention, unusual pressure drops in a pipeline or main such as might be caused by a break therein are quickly sensed by our new automatic control which can operate at line pressure. That automatic control may be in a unit which can readily be mounted adjacent to a valve operator to actuate it to close a valve when any such break occurs and irrespective of which side of the valve such break may occur on.

Other objects, advantages and features of this invention will be apparent from the following description and the accompanying drawings, which are illustrative only, in which:

FIGURE 1 is a view in elevation of one embodiment of this invention shown cooperatively connected to a valve operator capable of opening or closing a valve in a pipeline or main;

FIGURE 2 is a view in elevation and partly in section of the embodiment shown generally in FIGURE 1; such view being taken along line 2—2 of FIGURE 3;

FIGURE 3 is a view taken along line 3—3 of FIGURE 2;

FIGURE 4 is a perspective view of poppet valve and closure parts in the embodiment when viewing the left-hand side of FIGURE 3;

FIGURE 5 is a somewhat enlarged view of certain of such poppet valve and closure parts shown on the right-hand side of FIGURE 3, with the poppet valve closed;

FIGURE 6 is a view similar to that shown in FIGURE 5 with the poppet valve open;

Figure 7:
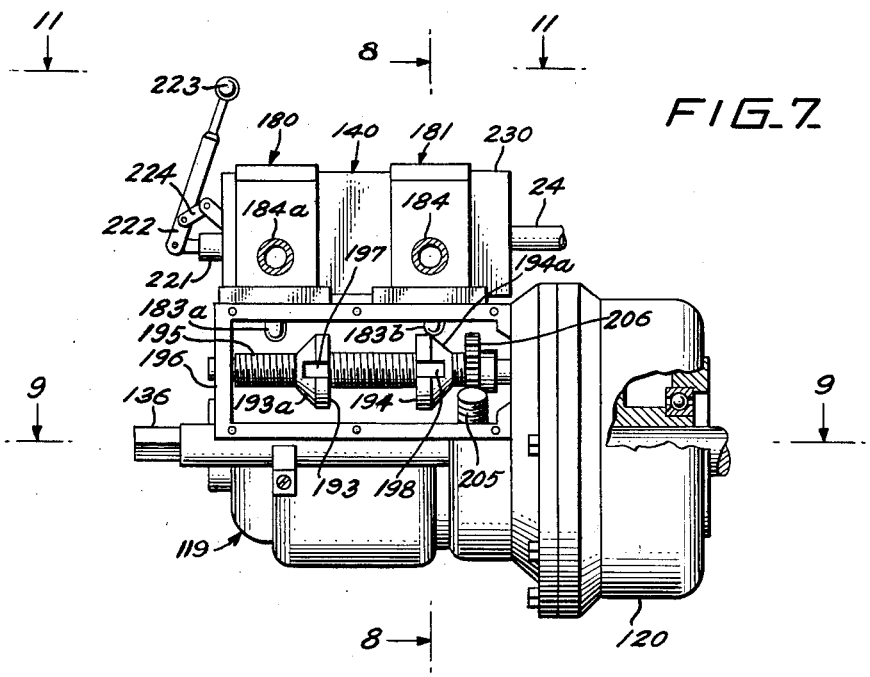
FIGURE 7 is a view in elevation of a valve operator as shown in FIGURE 1; such view being taken along line 7—7 of FIGURE 8.

FIGURE 11 is a plan view, partly in section, taken along line 11—11 of FIGURE 7; and FIGURE 12 is a schematic view of embodiments of this invention connected into a system to provide for selective automatic control over the closing of valves in gas lines in parallel conduits such as might be used in crossing rivers; one arrangement being indicated in full lines, and an alternate arrangement being indicated in dotted lines.

As illustrated in FIGURE 1, a valve 10, which may be referred to as a "main" or "operated" valve, may have a stem 11 threadably connected to a gear 12 so that upon rotation of gear 12, valve 10 will be moved in an opening or closing direction in accordance with the direction of rotation of gear 12. While the control of this invention is illustrated in FIGURE 1 as being mounted adjacent a valve operator on a valve of the rising stem type, it is to be understood that the invention can be employed with valves of other types, such as non-rising stem valves, plug valves, and the like.

Gear 12 is connected to a drive gear 13 fixed to an output shaft 14. This output shaft is normally motor driven by a valve operator 15, is mounted upon a casing 16 surrounding gears 12 and 13 and supported upon a valve bonnet 17. An extension 18 of casing 16 provides a cover for stem 11.

One automatic control embodiment 20 of this invention may be mounted adjacent to valve operator 15, or it may be mounted in a separate remote location. Control 20 is connected to pipes 19 and 21 extending to spaced taps into a pipe line 25 as shown in FIGURE 1 to supply fluid, such as a gas passing through line 25, to the control 20. The pipeline 25 is gradually reduced at 25' toward the opposite sides of the gate valve 10 to provide a venturi effect and pressure drop across the valve. Conduits 19a and 21a extend from lines 19 and 21, respectively, and form a manifold to supply gas to conduits 18a and 134 connected to limit valves 180 and 181 respectively. Discharge lines 22 and 23 extend from opposite sides respectively of control 20 to a line 24. Line 24 is connected to one end of a selector valve 140 in valve operator 15.

Referring to FIGURES 2–6, control 20 has substantial "mirror" symmetry in the left-hand and in the right-hand sides thereof in FIGURE 3 about the line 2—2. It comprises two housing or body sections 26 and 26', providing chambers 27 and 27' therein respectively. Gas from line 21 enters chamber 27' through a passage 28 in section 26', and gas from line 19 enters chamber 27 through a like passage 28 in section 26.

Chambers 27 and 27' are separated by a diaphragm 30 to quickly sense any abnormal increase in pressure differential such as would occur if the relative pressure in one of the chambers should suddenly drop due to a pipeline break or other cause. When the pressure in either chamber 27 or 27' drops, the connection of the respective chamber to pipe 23 or 22, is tripped open.

Diaphragm 30 may be made of an elastomer like rubber.

To avoid any tendency of the diaphragm to rupture (particularly when the pipeline pressure is high) and secure effective sealing and clamping, a recess 29, of slightly less depth than the thickness of a selected flexible diaphragm 30, may be formed in the inner face 31' of the section 26' with a plurality of concentric annular grooves 32' therein. A plurality of facing concentric annular grooves 32 may be formed in the inner face 31 of section 26. Hence, when the diaphragm 30 is installed and the sections 26 and 26' are secured together, the diaphragm 30 is firmly held and seals the chambers 27 and 27' against leakage from one into the other. Each side of diaphragm 30 is provided with a diaphragm follower in the form of a backing plate 34 positioned close thereto. Each plate 34 in the respective chambers 27 and 27' has a supporting face of a diameter substantially equal to the diameter of the center of the diaphragm. Each follower 34 is operated by the diaphragm and moreover supports its center against possibility of rupture under an excessive pressure surge. Cap screws 33 may be used to bolt the sections 26 and 26' together.

Each housing of sections 26 and 26' has an axially extending threaded opening 36 in which a spring cage 35 is fastened. A stud 37 has a flange 38 thereon to shoulder at 39 against cage 35. Stud 37 extends through opening 40 in cage 35 and is threadably connected at its inner end to the respective backing plate 34 which it thereby supports in position within the chamber. The axial distance between the flange 38 and inner end of the stud 37 at plate 34 is such that the surface of plate 34 adjacent diaphragm 30 is parallel and very close thereto.

Each cage 35 has an outer threaded counterbore 41 and a central, smaller diameter bore 42 in communication therewith terminating inwardly at shoulder 39. An adjustable stud 43 with a threaded head 44 engages bore 41. A reduced portion 45 of stud 43 has a groove 46 for a sealing O-ring 47. The inner end of portion 45 has a groove with a ball 48 therein to bear against a spring cap 49 for a spring 50 in bore 42. The spring 50 is held between stud 43 and the flange 38 on the stud 37.

Each cage 35 may be marked at 51 with scale graduations to indicate the compressive force of spring 50. A vernier cylinder 52 may be graduated radially at 53 with relation to the distance between respective graduations 51. The cylinder 52 is locked upon the stud 44 by a lock nut 55 so that upon turning 52, ball 48 is moved axially until the exact spring force desired is obtained as shown by the vernier markings. Then a set screw 54 is tightened to lock cylinder 52 in its selected position on cage 35. Since there is such a spring and cage assembly for each of the "mirror" halves of control 20, it is possible, should there be any compensation needed, to set the respective springs 50 to exert selected different forces. Generally, the forces of the springs 50 will be about equal and higher than the respective limits of any pressure differential across the diaphragm 30 that might be expected in the course of all normal operations.

A poppet valve assembly 56 in each chamber is provided for the passage of gas out of either chamber 27 or 27', as the case may be, into the respective lines 23 and 22. The respective assembly 56 is quickly tripped open by an abnormal pressure drop across diaphragm 30 and therefore across valve 10 exceeding the predetermined selected limit for which control 20 is set. Each poppet valve assembly 56 includes a closure assembly 57 which has one end of a spring strip 58 fixed in place between blocks 59 and 60 by screws 61. A trip bar 62 is clamped to the other end of strip 58 by block 63' and screws 61'. Bar 62 has a slot 63 so that stud 37 and latching mechanism 81 can extend therethrough.

The upper end of bar 62 has a valve closure 64 mounted thereon with a resilient closure disc 65 of neoprene, rubber, or similar resilient material therein. A fitting 66 is threadably connected at 67 to each section and communicates with each chamber therein respectively. A further fitting 68 having an opening 70 therethrough is held in the inner end of adapter fitting 66 with opening 70 in registry with opening 69 through fitting 66. The disc 65, when the lever arrangement 57 is latched, closes such openings 70 and 69 and thus controls flow out through them respectively into a discharge line 22 or 23 and thence to pipe 24 and operator 15.

The spring 58 is set or biased so that when valve assembly 56 is not latched closed, bar 62 holds closure 64—65 away from fitting 68 in the direction as shown in FIGURE 6.

To provide for positional adjustability and latching of bar 62, similar assemblies as 71 are provided to each side of bar 62. Each assembly 71 includes a spring strip 72 fixed in place between blocks 73 and 74 by screws 61" which in turn are fastened to the respective body section. The upper ends of the spring strips 72 are connected to arms 75 by screws 61'a and blocks 76. A crossplate 77 is fastened to the upper ends of arms 75 to each side of a bar 62. Bar 62 is adjustably connected thereto to plate 77 on its side of control 20 by screws 78 and lock nuts 79. A wearplate 80 is mounted on plate 77.

It can thus be seen that assemblies 71 in each section are anchored to the section by separate springs 72 from spring 58 which anchors assembly 57, and if the springs 72 have a different initial temper or set than spring 58, the arms 75 and the bar 62 normally would assume different angles away from fitting 68 except to the extent they are brought closer by adjustment screws 78.

In order to latch the closure assemblies 57 and 71 to maintain each poppet valve assembly 56 closed, a latching assembly 81 is provided in each "mirror" body section 26 and 26'. Assembly 81 comprises a latch plate 82 rigidly connected to a resilient bracket 83 which in turn is clamped at its other end to the respective housing section by means of hold-down plate 84 and screws 85.

Latch plate 82 is normally held by bracket 83 in the position shown in FIGURE 6. When tripped out of latched position, the adjacent interconnected bar 62 and plate 77 take the relative positions also shown in such FIGURE 6. The slot 63 in bar 62 is of a length to permit latch plate 82 to extend therethrough.

To latch the lever assemblies 57 and 71 in position to close opening 70 and thereby poppet valve 56, it is necessary to move bar 62 with its plates 77 and 80 to the right as shown in FIGURE 6 until a catch 86 on plate 82 engages and holds wear plate 80 as shown in FIGURE 5.

To accomplish such latching after one of the valves 56 is tripped open, a reset assembly 87 is provided on each side of diaphragm 30. Such a reset assembly includes a shaft 88 having an enlargement 89 thereon within a recess in its chamber 27' or 27, as the case may be. A handle 90 is affixed to shaft 88 externally of the housing section by a setscrew 91 so that the handle is mounted on the housing. Inwardly of the enlargement 89 a reset cam 92 is provided for which dimensions to bear against the wear plate 80 during angular rotation from the position shown in FIGURE 6. Such rotation moves the assemblies 57 and 71 from their FIGURE 6 position into a latched position as shown in FIGURE 5, after which rotation may continue until cam 92 returns to its readiness position as shown in FIGURE 5. To indicate that a valve 56 has been latched closed, a hemispherical indentation 93 in the inner face thereof of handle 90 will snap back into engagement with a spring pressed ball 94, as shown in FIGURE 3.

Springs 95 may be held in suitable recesses (not shown) in each body section to press inwardly against the bar and arm assemblies 57 and 71, carrying the closure 64—65 for the poppet valve, to snap such poppet valve open when latch plate 82 is tripped open in the course of a response by control 20 to an abnormal pressure drop across its diaphragm. Conversely, when the valve closure element 64—65 is closed, its accompanying bar and arm assemblies engage and compress such springs 95 (FIGURE 4).

In operation, assuming a break in pipeline 25 on side A of valve 10 to the right in FIGURE 1, a sudden sharp reduction in the gas pressure in chamber 27' will take place relative to the gas pressure in chamber 27. As a consequence, a diaphragm 30 will quickly be forced to the left as shown in FIGURE 3 and will press against follower plate 34 in chamber 27'. Continuing movement of plate 34 in chamber 27' to the left against the resistance of its spring 50, will cause the back of that follower 34 to strike against the lower part of plate 82 in chamber 27', disengaging it from its hold on plate 80. Thereupon, poppet valve assembly 56 in chamber 27' will be snapped open and be as shown in FIGURE 6, opening passages 70 and 69 and line 22 to the passage of gas to that end of selector valve 140 in valve operator 15 which will immediately move valve 140 to its valve 10 closing position.

The new automatic control 20 will operate just as effectively should there be a break on the other side of valve 10, to the left as viewed in FIGURE 1, dropping the relative pressure in chamber 27 and causing diaphragm 30 to move to the right and the various assemblies in chamber 27 to act in the manner just hereinabove described in connection with chamber 27'. It may also be noted that regardless of the direction of operative movement of diaphragm 30 in control 20, the impulse reaches pipe 24 which moves valve 140 to its position under which operator 15 will act to close the valve 10. Moreover, the manifolding across the two sides of valve 10 will furnish operator 15 with motive fluid from the pipeline even if there should be a total failure on the damaged side thereof relative to the valve 10.

To safeguard against too great a "stroke" or movement on the part of a plate 34 against its latch plate 82, frusto-conical faces 236 may be provided in the housing sections 26 and 26' normally at a distance 235 slightly spaced from rims 237 of the respective backing plates 34. Hence, when a latching assembly 81 is tripped by a backing plate 34, further outward travel thereof due to the exertion of pressure from the opposite chamber will be limited to that short distance before the rim 237 abuts the face 236.

Automatic control embodiments of this invention may be effectively utilized in cooperation with a valve operator of the kind set forth in the application for United States Letters Patent Serial No. 322,934, filed November 28, 1952 by the aforesaid Lynn T. Elliott jointly with James N. Morrell for "Unitary Power Operator for Opening and Closing Valves," and the description of valve operator 15 herein which follows concerns that kind of valve operator so set forth in the aforesaid patent application, now Patent No. 2,743,897.

Figure 8:
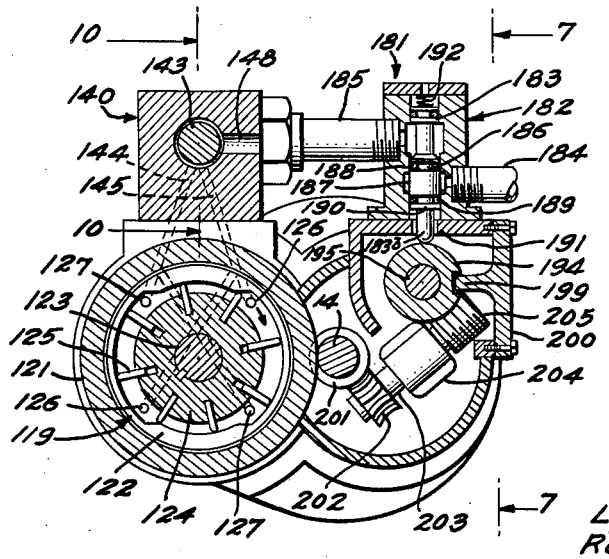
FIGURE 8 is a view taken along line 8—8 of FIGURE 7.

Referring now to FIGURES 7 and 8, it will be seen that the valve operator 15 comprises generally a motor 119, a force transmitting means 120, such as a speed reducing mechanism, and controls for stopping and starting and also determining the direction of rotation of motor 119.

Referring to FIGURE 8 in particular, it will be seen that the motor 119 comprises a housing 121 in which is mounted a cam ring 122. Rotatable drive shaft 123 of the motor is journaled in the housing and has a rotor 124 keyed thereto. Rotor 124 bears a plurality of vanes 125 in radial slots around its periphery and these vanes are urged outwardly from their respective slots so that their outer ends bear against cam ring 122. When rotor 124 is rotating in the direction of the arrow shown in FIGURE 8, gas is admitted through ports 126 into the space between the vanes as each vane rotates past the ports and as it emerges into the long radius portion of the cam ring. With this direction of rotation, ports 127 serve as discharge ports and gas discharges from the space between adjacent vanes as each vane approaches the short radius portion of the cam ring. In this manner, gas is admitted between the vanes to turn rotor 124 and shaft 123 and to be discharged from the motor when the effective pressure head of such gas has been consumed.

On the other hand, when the motor is to be rotated in a direction opposite to the arrow shown in FIGURE 8, ports 127 become the gas inlet ports and ports 126 the gas discharge ports. With this direction of rotation, the action of the gas is as described above except for the reversal of ports.

Thus it will be seen that there is provided a motor of the reversible rotary type, which is adapted to drive bevel gear 13 through speed reducing means 120. With a motor of this type, the working parts thereof, such as vanes 125, rotor 124 and cam ring 122, may, if desired, be provided with an easy fit to permit gas seepage through the motor when, e.g., climate conditions warrant to prevent freezing of the motor, or bubble-tight valves are not utilized in such a valve operator.

Figure 9:
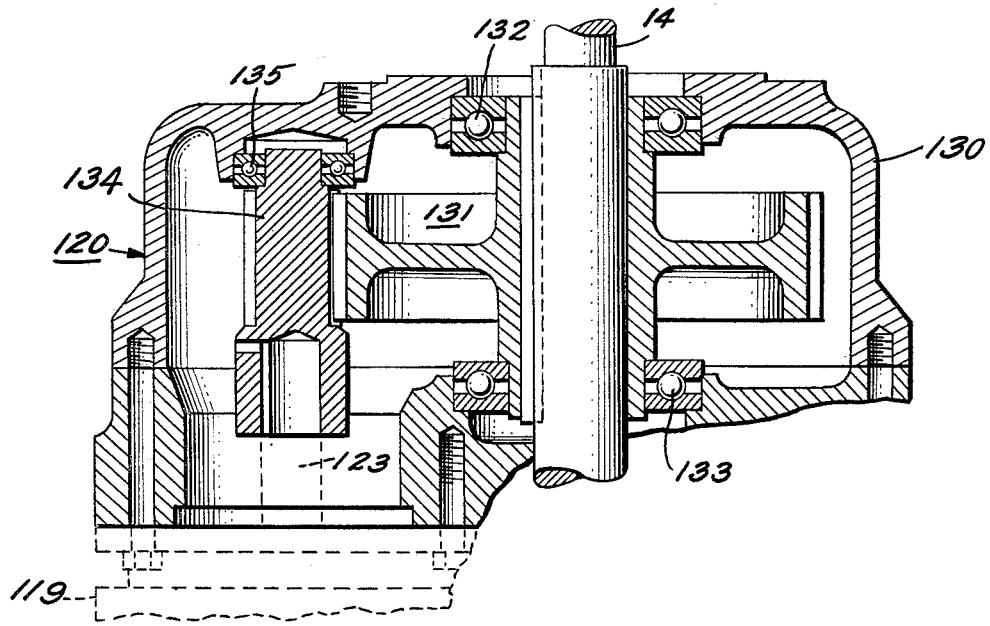
FIGURE 9 is a view taken along line 9—9 of FIGURE 7.

As stated above, the motor is connected to a force transmitting means which is illustrated herein as a speed reducing mechanism 120. Such speed reducing mechanism as best seen in FIGURE 9, may comprise a frame or housing 130 which rotatably supports driven gear 131 by means of bearings 132 and 133. Meshing with gear 131 is a driving pinion 134 having one of its ends supported in the housing 130 by a bearing 135. The other end of the gear is formed to receive shaft 123 of the motor so that power can be transmitted from the motor through gears 134 and 131 to shaft 14. It will be noted that shaft 14 can pass entirely through housing 130 and is keyed to gear 131. This permits mounting of the valve operator on the main valve by merely sliding it over shaft 14 and bolting it to the main valve housing.

As illustrated in FIGURE 7, shaft 14 extends to have a free end beyond the valve operator and this end is formed with a wrench-hold 136 so that a handwheel, wrench, or other means can be mounted thereon to manually open and close the valve.

In accordance with the foregoing statements, there is provided a selector valve, designated generally by the numeral 140 in FIGURES 7 and 8, adapted to control not the flow of fluid through the motor but also its direction of flow.

Figure 10:
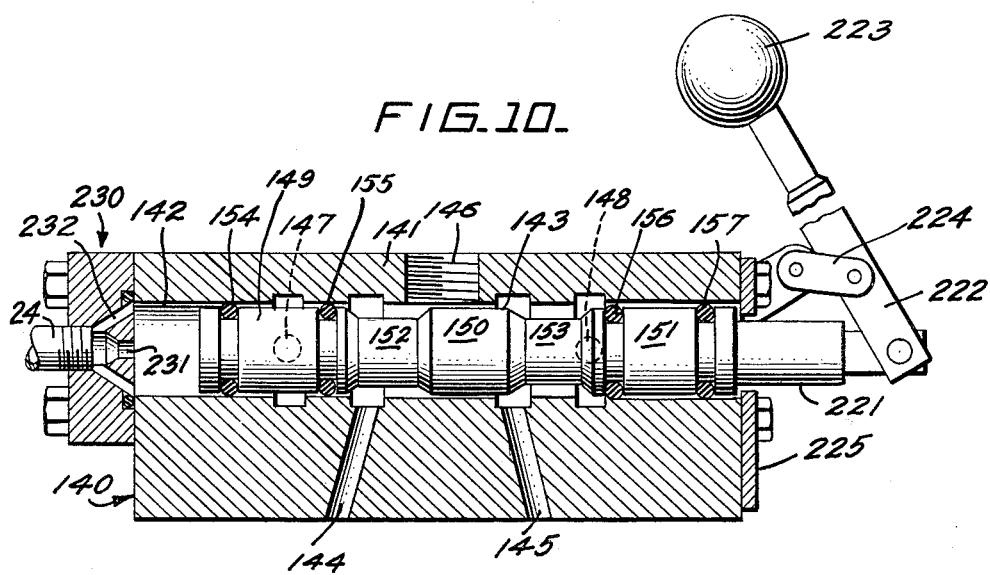
FIGURE 10 is a view taken along line 10—10 of FIGURE 8.

Referring to FIGURES 10 and 11 for the details of the selector valve, it will be seen that it comprises a housing 141 having a bore 142 therethrough in which is slidably received a valve member or element 143. The housing is provided with ports 144 and 145 which connect, respectively, with ports 127 and ports 126 of the motor via interconnecting passages in the motor housing. It will be understood that, in accordance with the preferred construction of the motor, ports 126 are on one side of rotor 124 and ports 127 are on the other side although they are shown on the same side in FIGURE 8 to simplify the drawing. It is for this reason that the ports 144 and 145 are shown in FIGURE 10 to diverge outwardly since each port connects with a passage to either side of rotor 124. Housing 141 is also provided with an exhaust port 146 through which fluid from the motor exhausts as will be explained below. Inlets 147 and 148 are provided in housing 141 for the introduction of a pressure fluid or gas from an external source.

Referring now to valve member or element 143, it will be seen to include three large diameter portions 149, 150 and 151 each having a sliding fit with bore 142. Spaced intermediate these large diameter portions are reduced diameter portions 152 and 153 providing annuli between the valve member and the walls of bore 142 to act as gas conducting passages between the various ports. The valve member can be provided with sliding seals, such as O-rings 154, 155, 156 and 157, so that large diameter portions 149 and 151 can be moved back and forth within bore 142 to act as valve elements to open and close inlets 147 and 148 to ports 144 and 145, respectively.

Selector valve 140 shown in FIGURE 1 may be manually operated. Thus, the valve element 143 is extended from the portion 151 by means of an extension 221 passing through an end closure plate 225. A lever 222 is pivotally mounted on the end of the extension 221 to extend thereabove and above the extension a linkage 224 is pivotally connected at one end to the closure plate 225 and at the other end to the lever 222. The lever 222 extends above the linkage 224 and has a handle 223 thereon.

An adapter plate 230 is installed on the opposite end of the selector valve 140 from the lever 222 to form the connection to the line 24 into which gas is supplied from the outlet valves 56 from the pilot valve 20. An axial port 231 extends from the connection of the adapter 230 to the line 24 through the inner face of the adapter and ports 232 extend angularly from the connection of the line 24 into the adapter plate through the inner face thereof to the periphery of the bore 142.

A selector valve as shown in FIGURES 10 and 11, operates, in the position of FIGURE 10, to let gas from port 148 pass to port 145 and then to ports 126 in the motor 119 to drive the motor in a direction to close the gate valve 10. At the end of closure the limit valve 181 closes, and the limit valve 180 opens, as will be explained hereinbelow. This stops the motor as no supply gas can pass thereinto, communication between ports 145, 148 being open while limit valve 181 is closed, and communication between ports 144, 147 being closed while limit valve 180 is open. See FIGURE 10 in connection with FIGURE 11.

Now if the handle 223 in FIGURE 10 is forced to the right, the valve element 143 may be slid to the left until its end portion 154 abuts the adapter 230. This opens communication between ports 144, 147, and since limit valve 180 is open gas may now pass through to ports 127 to drive the motor 119 in direction to open the gate valve 10. At the end of the opening of this valve, limit valve 180 closes as limit valve 181 opens. Thus again the condition has been restored in which limit valve 181 is opened while communication between ports 148 and 145 is closed, while limit valve 180 is closed while communication is open between ports 144, 147.

In this condition, with the valve element 143 abutting the inner face of the adapter 230, the selector valve 140 awaits the arrival of gas from the control 20 and pipe 24 to move the valve element to the right in FIGURE 10 to open the ports which enable closure of the main valve 10. As resistance may occur in conditions where there is face-to-face abutment between the left end of the valve element and the inner face of the adapter 230, the diagonal passages 232 are provided so that part of the gas from the pilot valve may bear against the extreme end of the portion 149 and seal 154, thus the valve element 143 may be urged to the right to free any "sticking" adherence between the adapter and the end face of the valve element so that gas may pass through the axial passage 231 to more forcefully urge the valve element 143 to the right.

It is apparent that after gas or fluid has passed through the motor 119 and expended its power therein, it will be exhaused to outlet 146 through that port of the two ports 144 and 145 which may not be in communication with its corresponding inlet ports 147 and 148. Thus, in FIGURE 10 gas from the motor 119 may exhaust through port 144 to the outlet 146, since in this figure, the ports 144 and 147 are not in communication.

It will be noted that large diameter portion 150 is not provided with any sliding seals so that if there is any leakage past O-rings 155 and 156 into the motor, such leakage is free to escape by seeping past portion 150 into exhaust 146. If desired, small by-pass passages may be provided around O-rings 155 and 156 for use in the wintertime.

The limit valves 180 and 181 have been described hereinabove as being adapted to stop the motor 119 as one limit valve closes at the end of operating the main valve 10 and the other limit valve opens. Such limit valves are operable to stop the motor after it has turned a predetermined number of revolutions in either direction. As shown in FIGURES 7, 8, and 11, each of these limit valves 180 and 181 comprises a housing 182 in which a valve member 183 is slidably mounted. Inlets 184 and 184a are provided for the limit valves 181 and 180, respectively, to introduce fluid from a gas supply source. This fluid passes from each limit valve to its respective inlets 147 and 148 in the selecter valve as by conduits 185 and 185a. A seat 186 is provided in the housing intermediate the inlets and outlets thereto and cooperates with an enlarged diameter portion 187 of valve element 183, such portion being provided with seal rings 188 and 189, the former providing a seal with the seat to prevent the escape of fluid when the valve is closed.

The lower end 190 of the enlarged diameter portion is adapted to abut against a housing plate 191 to provide a stop for the valve element. Disposed on the opposite end of the valve element is a spring 192 acting to urge the valve element toward open position. With this construction, it will be apparent that with the limit valve in the position shown in FIGURE 8, flow from inlet 184 through conduit 185 is prevented, but that by permitting spring 192 to move the valve element so that part 190 is in abutment with plate 189, the valve is opened and fluid will flow to the selector valve inlet 148.

Means are provided for opening and closing a limit valve after the motor, or the output shaft from the force transmitting means, has been turned a predetermined number of revolutions. This means is carried by a rotatable part driven by the motor so that the valve operator can be constructed as a compact unit and can have all of its working parts operatively independent of the main valve upon which it is to be mounted. Thus, referring to FIGURES 7 and 8, there are provided movable elements 193 and 194 having cam surfaces 193a and 194a, respectively.

The limit valve members 183 are each provided with an actuating element in the form of stems 183a and 183b, respectively, which are adapted to be engaged by movable elements 193 or 194, respectively, when the latter are in one position to seat one of the limit valve members while the other limit valve member is permitted to move to unseated position. The cam elements and associated parts are carried upon a movable part, such as rotatable shaft 195 having its ends journaled into a housing 196. Cooperating actuating parts are carried by the cam elements and the rotatable part providing for reciprocal movement of the cam elements responsive to rotation of the rotatable part. Such actuating parts can be mutually engaging threads on shaft 195 and on cam elements 193 and 194.

Each of cam elements 193 and 194 are provided with longitudinal slots 197 and 198, respectively, which are adapted to engage a bar 199 carried by cover plate 200. In this manner, a sliding connection is provided between the stop part formed by bar 199 and the cam elements to prevent turning of the latter relative to the limit valves. With this construction, it will be apparent that when shaft 195 is rotated, the cam elements will move back and forth along the shaft dependent upon the direction of the latter and the cam elements will alternately engage and disengage that one of the valve stems 183a and 183b adjacent thereto to thus alternately open and close the limit valves. It will also be apparent that the spacing between cam surfaces 193a and 194a and hence the number of rotations the motor can turn before one cam element permits one limit valve to open and the other cam element closes the other limit valve, can be readily and easily adjusted by merely removing cover plate 200. In so removing the plate, bar 199 is likewise removed and it is possible to rotate either one of cam elements 193 and 194 to adjust their spacing. Upon replacement of the cover plate and the bar in engagement with slots 197 and 198, the cam elements will remain in such adjusted position until a further adjustment is made.

A driving connection is provided between the motor and the rotatable part 195. As described above, shaft 14 is driven by the motor and gear 201 is keyed to this shaft to engage a gear 202 carried by shaft 203. Shaft 203 is supported by a bearing mount 204 connected to the housing and has a helical gear 205 on its other end adapted to drive gear 206 on shaft 195. In this manner, shaft 195 will be driven by the motor and its directional sense of rotation will be dependent upon that of the motor.

In discussing the operation of the apparatus thus far described, let it be assumed that the cam elements are positioned as shown in FIGURE 7 so that limit valve 180 is open and limit valve 181 closed. Since a pressure fluid is supplied to inlets 184 and 184a of the limit valves, such pressure fluid will be transmitted to inlet 147 of the selector valve whereas inlet 148 will not have the fluid supplied thereto. In this position with the selector valve element 143 in the position shown in FIGURE 10, a condition will exist in the motor 119 which can receive no motive gas or fluid through the selector valve from either limit valve and more remotely from the source of supply.

Now when the lever 222 is actuated manually to move the valve element 143 to full left position as shown in FIGURE 10, as has been hereinabove described, supply fluid may now pass from the supply line through open limit valve 180 via port 147 through ports 144 and 127 to actuate the motor 119 to rotate in direction to open the valve 10. The drive shaft 14 now drives the shaft 195, via the transmission of elements 201, 203, 205 and 206, in direction to move the cams 193 and 194 to the left along the shaft 195 as shown in FIGURE 7.

At the beginning of this rotation the cam 194 moves out of contact with the valve stem 183b so that the spring 192 in the limit valve 181 may urge it downwardly to open this limit valve. At the end of rotation the valve 10 arrives at full open position as the cam 193 arrives to lift valve stem 183a to close limit valve 180. This reestablishes a condition in which limit valve 180 is closed while communication is established between passages 147 and 144 and in which limit valve 181 is open while communication is closed between passages 148 and 145.

Obviously, if the selector valve element 143 is now moved to the right to the position shown in FIGURE 10, as by gas entering the selector valve through line 24, pressure fluid or gas may now flow to the motor through open limit valve 181, and via communicating passages 147, and 144, and ports 126 to actuate the motor 119 to close the gate valve 10.

In this case the drive shaft 14 again drives the shaft 195, via the same transmission of elements 201, 203, 205, and 206, but in direction to move the cams 193 and 194 back to the right as shown in FIGURE 7. Thus the cam 193 first moves free of the limit valve stem 183a so that it is urged into position to open limit valve 180, and at the end of travel, as the gate valve arrives at fully closed position, the cam 194 lifts the valve stem 183b to close limit valve 181. Again the condition shown in FIGURES 7, 8 and 10 is established in which limit valve 181 is closed while communication exists between passages 148 and 145, and in which limit valve 180 is open while communication is closed between passages 147 and 144.

Referring now to FIGURE 1, it can be readily seen how a rupture in the pipeline 25 to the right of the gate valve 10 will result in an abnormal pressure differential across valve 10 and control 20 will open the poppet valve to line 22 so that supply gas may pass out through this line and via line 24 to position the selector valve element 143 as shown in FIGURE 10 whereby the valve operator 15 rotates the valve stem 11 to close the gate valve 10.

Conversely it can be seen how, in case of a rupture to the left of the gate valve 10, the control 20 will open the poppet valve to line 23 so that supply gas may pass out through this line and via line 24 to position the selector valve 143 so that valve operator 15 operates to close the gate valve 10.

Referring now to FIGURE 12, a practice of this invention is shown applied to the crossing of rivers by fluid lines, as gas pipelines. It is the general practice in making such crossings to carry the gas or fluid across in a plurality of mains. Thus, in case of breakage of one of the mains beneath the river, or in the more inaccessible approaches thereto, flow may still be continued in the alternate line or lines, while the broken line is isolated by the closing of the necessary valves to accomplish such isolation.

Heretofore the operation of the necessary valves to effect this isolation has been slow of operation, with attendant loss of gas or fluid, and attempts at setting up automatic safeguards have been inadequate and far from positive in operation. However, with an understanding of the foregoing combinations of apparatus, it can be seen how a positively and effectively automatic system may be established to insure that isolation of any branch of any multiple main pipe line may be carried out with the aid of the automatic operation of the new control hereinabove described.

In the pipeline system disclosed in FIGURE 12, parts corresponding in structure and functioning are generally provided with the same reference numerals as those appearing in prior figures. In FIGURE 12, a main pipeline 25 has a venturi type gate valve 10 installed therein at the approach to a river 240. A by-pass line 241 leads from the line 25 on the approach side of the river and has a valve 242 therein of the venturi type. Such bypass line may be of smaller diameter than the main line 25, as for instance 18". At a spaced distance from the main line 25, the by-pass line 241 joins a second pipeline 25', of similar diameter to the main line 25, and this second pipeline 25' extends across the river parallel to the main line 25 at a spaced distance therefrom.

Across the river the main lines 25 and 25' are interconnected by a by-pass line 241' of size similar to the by-pass line 241 and having a venturi type valve 242' therein. A gate valve 10' is shown in full lines installed in the line 25 on the side of the by-pass line 241' away from the river.

A valve operator 15 is shown installed adjacent the valve 10 and connected to operate it. Similarly a valve operator 15 is shown installed to operate the venturi type valve 242. A control 20 is shown with supply lines 19 and 21 receiving supply gas or fluid from spaced apart points on the line 241, such points being on opposite sides of the valve 242.

The outlet line 23 from the automatic control 20 and also the opposite outlet line 22 therefrom join in the line 24 to supply selector valve actuating gas or fluid to the valve operator 15 for the valve 242. A branch line 22' from the outlet line 22 supplies selector valve actuating gas or fluid to the valve operator 15 for the main valve 10. Thus the control 20 serves as the common actuator for the valve operators for both valve 10 and 242.

Lines 19a and 21a from the main line 25 and from opposite sides of the gate valve 10 therein are connected to supply the motivating gas to the limit valve inlets 184 and 184a to the valve operator 15 for the gate valve 10, and similar lines are connected into the by-pass line 241 on opposite sides of the venturi type valve 242 to supply motivating gas to the operator 15 for such venturi type valve.

On the opposite side of the river similar apparatus is installed in the form of valve operators for the gate valve 10' and the venturi type valve 242', including a control 20 with supply lines thereto from the by-pass line 241' extending from points on opposite sides of the valve 242'. The outlet lines to the selector valves of the gate valve operator and of the venturi type valve operator are connected in correspondence with the connections across the river, and the supply gas line to the limit valves for such operators are likewise connected in correspondence with the connections across the river. Thus the control 20 on this side of the river serves as the common actuator for the valve operators for valve 10' and 242'.

It can thus be seen that in case of breakage in the line 25' or in the parts of the lines 241 or 241' between the line 25' and the valves 242, 242', supply gas to the control 20 on the upstream side of the river will flow thereto through the line 19 to the control 20 and out therefrom via the lines 23, 24 to actuate the valve operator 15 for the venturi type valve 242 to close this valve. Similarly on the downstream side of the river, the breakage in the line 25' will result in supply gas flowing via the supply line 19 to the control 20 on that side of the river and from the control 20 via the line 23 to actuate the valve operator 15 for the venturi type valve 242' to close this valve. Thus the flow of gas to the line 25' and to those parts of the by-pass lines 241 and 241' in communication therewith is cut off at the venturi type valves 242 and 242'.

Conversely, if breakage occurs in the line 25 between the gate valves 10 and 10', or in the parts of the lines 241 or 241' between the line 25 and the valves 242, 242', supply gas from the controls 20 on each side of the river will flow out the lines 21 thereto to the respective chamber, and thence the gas will flow out the lines 22' from the controls to the valve operators 15 for the gate valves 10 and 10' and actuate these valve operators to close these valves. Also actuation gas from the controls will flow therefrom through the lines 22, 24 on each side of the river to actuate the valve operators for the valves 242 and 242' in the by-pass lines to close these valves. Thus the line 25 and those parts of the lines 241, 241' in communication therewith are isolated between the gate valves, and the by-pass lines 241 and 241' are isolated on the sides of the respective gate valves 242 and 242' in communication with the line 25.

Let a condition be assumed where the gas may be brought to the river in two mains, carried across in two mains and continued downstream in a single main. In this case the arrangement shown in full lines in FIGURE 12 is augmented by the addition of the gate valve 10 shown dotted in the upstream portion of the line 25'. A valve operator 15 is supplied for this valve, and connections made as indicated in the dotted connection lines including the line 24' from line 23. Obviously under these conditions breakage in the line 25' downstream of the upstream gate valve 10 and in those parts of the by-pass lines 241 and 241' in communication with the line 25', will be isolated by closure of the venturi type valves 242 and 242' and also closure of the dotted gate valve 10 on the upstream side of the river in line 25'. Thus the line 25' and those parts of the by-pass lines 241, 241' in communication therewith will be isolated between the venturi type valves and this upstream gate valve 10 in main 25'.

Assuming a converse case, where gas may be brought to a river in a single main, carried across the river in two mains, and continued downstream in two mains, the arrangement shown in full lines in FIGURE 12 is augmented by the addition of the gate valve 10' and related structure shown dotted in this figure on the downstream side of the river including the line 24' from the line 23. In such a case, upon the occurrence of breakage in the line 25' or in those parts of the by-pass lines 241 and 241' in communication therewith, the venturi type valves 242 and 242' will close, as will the gate valve 10' in main 25' on the downstream side of the river, and the line 25' and the parts of the by-pass lines 241 and 241' in communication therewith will be isolated.

In still another condition gas may be brought to a river crossing in two mains, carried across the river in two mains, an continued downstream therefrom in two mains. In such case all of the dotted structure shown in FIGURE 12 will be added to the full line structure to complete the system.

In such a system breakage in the line 25' or in those parts of the by-pass lines 241 and 241' in communication therewith on the proximate sides of the valves 242 and 242' will be accompanied by the closure of valves 242 and 242' and gate valves 10 and 10' in the line 25' so that the line 25' between the gate valves and the parts of the by-pass lines 241 and 241' in communication therewith will be isolated.

Resolved in terms of equivalent circuits, FIGURE 12 in effect discloses a main 25, and a parallel connected conduit 241, 25', 241'.

If the line 25' and its gate valve 10 is completed, as shown in dotted lines, to join the line 25' as shown in full lines on one side of the river 240, then in terms of equivalent circuits the main 25 divides into two conduits, one comprising the main 25 and the other the elements 241 or 241' as the case may be, the main 25' as shown in full lines, and the gate valve 10 and main 25' as shown in dotted lines on one side of the river. Then the equivalent circuit is completed by the cross-connection line 241 or 241' as the case may be on the same side of the river as the part of the circuit shown in dotted lines.

If all of the dotted structure shown in FIGURE 12 is added, then the equivalent circuit in effect amounts to two parallel extending conduits with two spaced apart cross-connecting lines therebetween.

In each case a valve is located in a conduit or main before it branches or is cross-connected, and a second valve is located in the branch conduit or cross-connection with some degree of adjacency to the first valve. The supply pressure fluid through line 21 to the control 20 is taken from that part of the system isolated by the first and second valves, while pressure fluid through the line 19 is taken to the control 20 from the branch conduit or cross-connection on the opposite side of the second valve from the line 21.

It is desired that the control means for the control 20 on one side of its diaphragm 30 shall only complete fluid passage through that side of the automatic control pilot valve to the valve operator for the second valve, while the control means on the opposite side of the diaphragm may complete fluid passage to the valve operators for both first valve 10 or 10' and second valve 242 or 242'. Thus the line 22 has a check valve 252 therein which opens under pressure of fluid passing down the line 22 from the control 20, but which is forced closed by the pressure of fluid passing from the control 20 down the line 23 and through a corresponding check valve 251 and thence to the line 24 and by back-flow up the line 22 to the check valve 252. Conversely, the check valve 251 will be closed by the pressure of fluid flowing through the check valve 252 to the line 24, and by back-flow up the line 23 to the check valve 251.

It can thus be seen that a main may divide into any number of conduits to which the main may be connected by individual cross-connection lines, as the line 241. A valve 242 may be installed in each line 241 and a control 20 provided therefor and supplied from opposite sides of the valve 242. In each case the line 23 from such control 20, and with a check-valve 251 therein, supplies fluid to operate the valve operator 15 for the valve 242, whereas the control means on the opposite side of the control is connected to operate the main valve operator through the line 22' and the operator for the valve 242 through the line 22 having the check valve 252 therein. The line 22' may then, in effect, amount to a header into which the line 22 from one side of each control 20 is connected. Thus in every case, a change of condition affecting pressure drop, as for instance, a break in the system isolated between the first and second valves, results in closure of both valves, whereas a change in any branch, cross-connection, or side conduit on the other side of its valve 242 will result only in operating the operator for the valve 242.

It can thus be seen that automatic controls of the kind hereinabove described have great utility when employed in combination with valve operators adapted to perform after the manner of the novel operator which has been disclosed, and that such utility is particularly applicable to the control of gas or fluid systems, as the novel system of mains, main line valves, by-pass lines and by-pass line valves shown in FIGURE 12. Additionally it can be seen how control for purposes of isolating any section or maze of piping of any type of complex system may be calculated by arrangement of controls of the kind described herein operable on the pressure change principle in combination with valve operators for operating the valves of the maze or system. Moreover, the automatic control of this invention may be made as a one-way subcombination omitting the poppet valve and discharge line on one side of the diaphragm, to be used, for example, in a pipeline to safeguard against a break downstream from the main valve, where a break upstream would be protected against by a separate upstream control and main valve.

Reference is made to our copending allowed application for Letters Patent Serial No. 581,706, filed April 30, 1956, now abandoned of which this application is a continuation.

Various modifications, changes and arrangements may be made without departing from the spirit of our invention or the scope of the appended claims.

We claim:

1. A pressurized fluid system including a main having a main valve therein constituting a venturi type restriction, pressure fluid actuated means to operate said valve, a control having a diaphragm normally subjected to pressurized fluid on opposite sides of said restriction, control means on opposed sides of said diaphragm, said control means on that side of said diaphragm to which pressure fluid is supplied from the side of said restriction in the direction of a cause of abnormal pressure drop across said restriction being operable responsive to said drop to complete a fluid passage through such side of said control from said main to said valve operator to operate said main valve.

2. A pressurized fluid system including a main having two parallel connected conduits therein, a valve constituting a venturi type restriction in said main on opposite sides of said conduits and adjacent thereto and one of said valves in one of said conduits adjacent each of said main valves, a pressure fluid actuated means to operate each valve, and a control for each main valve and the conduit valve adjacent thereto, each control including a diaphragm normally subjected to system pressure fluid from opposite sides of said adjacent valve, and also including control means on opposed sides of said diaphragm, the control means on those sides of said diaphragms to which pressure fluid is supplied from said conduit between said conduit valves being operable, responsive to differential pressure change across said conduit valve restrictions caused by a condition in said conduit between said conduit valves, to complete a fluid passage connected to said main through such sides of said controls to said conduit valve operators to operate said conduit valves, and the other control means on the other sides of said diaphragms to which pressure fluid is supplied from the other sides of said conduit valves being operable, responsive to differential pressure change across said conduit valves and said main valves caused by a condition in said other conduit or in said system between said main valves and said adjacent conduit valves, to complete fluid passage through said other sides of said diaphragms to said conduit valve operators and said main valve operators to respectively operate said conduit valves and said main valves.

3. A pressurized fluid system including a main dividing into two conduits, a cross-connecting line between said conduits, a valve constituting a venturi restriction in said main, in a section of one conduit on the main side of said line, in said line, and in each conduit on the opposite side of said line from said main, a pressure fluid actuated means to operate each valve, a first control for said main valve and said conduit valves, each control including a diaphragm, the first diaphragm being counterpoised between system pressure fluid from opposite sides of said section valve and the second diaphragm being counterpoised between system pressure fluid from opposite sides of said line valve, each control having control means therein on opposite sides of its diaphragm, the control means on those sides of said diaphragms to which pressure fluid is supplied from the portion of said system isolated by said section valve, said line valve, and said one conduit valve being operable, responsive to differential pressure change across such isolating valves caused by a condition in said isolated portion, to complete a fluid passage connected to said main through said controls on such sides of said diaphragms to the valve operators for such isolating valves to operate such valves, and the control means on the other sides of said diaphragms being operable responsive to differential pressure change across said main valve, said section valve, said line valve, and the valve in the other conduit caused by a condition in the portion of said system isolated by such valves, to complete fluid passage through said controls on such other sides of said diaphragms to such isolating valves to operate such isolating valves.

4. A pressurized fluid system including a pair of conduits, spaced apart cross-connecting lines therebetween, a valve constituting a venturi restriction in each line and in each conduit outwardly of said lines, a pressure fluid actuated means to operate each valve, a control for each line valve and the conduit valves adjacent thereto, each control including a diaphragm counterpoised between fluid pressure from opposite sides of its line valve and having control means therein on opposite sides of said diaphragm, the control means on those sides of said diaphragms to which pressure fluid is supplied from the portion of the system isolated by said line valves and the valves in one conduit being operable, responsive to velocity head change across such isolating valves caused by a condition in such isolated portion, to complete a fluid passage communicating with a conduit through said controls on such sides of said diaphragms to the valve operators for such isolating valves to operate such valves, and the control means on those sides of said diaphragms to which pressure fluid is supplied from the portion of the system isolated by said line valves and the valves of the other conduit being operable, responsive to velocity head change across such isolating valves caused by a condition in such isolated portion, to complete fluid passage through said controls on such sides of said diaphragms to the valve operators for such isolating valves to operate said valves.

5. A pressurized fluid system including a main dividing into two separate conduits, a valve constituting a venturi type restriction in said main and in one of said conduits, a pressure fluid actuated means to operate each valve, a control including a diaphragm normally counterpoised between system pressure fluid from opposite sides of said conduit valve and also including control means on opposite sides of said diaphragm, the control means on that side of said diaphragm to which pressure fluid is supplied from the main side of said conduit valve being operable, responsive to velocity head change across said conduit valve and said main valve caused by a condition in said system on the main side of said conduit valve, to complete a fluid passage connected to said main through said control on such side of said diaphragm to said valve operators to operate said conduit valve and said main valve, and the control means on the other side of said diaphragm to which pressure fluid is supplied from the other side of said conduit valve being operable, responsive to velocity head change across said conduit valve caused by a condition in said system on the other side of said conduit valve, to complete fluid passage through said control on the other side of said diaphragm to the conduit valve operator to operate said conduit valve.

6. A pressurized fluid system as claimed in claim 5 in which each control means to said conduit valve operator contains a check valve therein to pass pressure fluid therethrough to said conduit valve operator while preventing pressure fluid flow from one control means through the other control means check valve.

7. In a control, in combination, a housing having two sections, a diaphragm bound between said sections to divide the interior of said housing into two fluid chambers, a separate supply passage for pressurized fluid into each chamber, a discharge passage from each chamber, and a control means for each passage comprising a valve closure therefor, and means on each side of said diaphragm and operable responsive to a drop in pressure in one of said supply passages relative to the other to trip the valve closure in the chamber supplied by said one passage.

8. A control as claimed in claim 7 in which at least one of said housing sections has a plurality of concentric grooves therein outwardly of said chambers to bind the rim of said diaphragm against likelihood of rupture by excess fluid pressure.

9. A control as claimed in claim 7 in which said means to trip includes an adjustably, yieldably biased plate of substantially diaphragm area to engage said diaphragm as it is moved by excess fluid pressure into such engagement, and a stop means in each housing section to stop said plate against excess movement.

10. A control as claimed in claim 7 which includes a reset cam in each chamber to reset said means to trip therein with said diaphragm in initial position counterpoised between pressure fluid in said chambers.

11. A control as claimed in claim 9 in which said valve closure comprises a valve element supporting leaf spring strip mounted lever bar, and a separate leaf spring supported lever arm adjustably connected to the adjacent end of said lever bar, and in which said trip means includes a resiliently mounted latch plate to latch against said bar and arm until tripped by contact of said plate thereagainst.

12. A pressurized fluid system including a main having a main valve therein constituting a venturi type restriction, a control including a diaphragm normally counterpoised between main pressure fluid from opposite sides of said restriction and also including control means on opposite sides of said diaphragm operable to complete pressure fluid flow through such side, a rotatable fluid motor, power transmitting means connected to said motor and adapted to be connected to said main valve to operate the same, limit valve means having main pressure fluid supplied thereto from opposite sides of said restriction, a selector valve having fluid communication with said limit valve means and connected to said control means to receive pressure fluid therefrom to shift said selector valve to control pressure fluid flow from said limit valve to said motor, a rotatable part driven by said motor, means movable by said rotatable part for closing said limit valve means after said motor has turned a predetermined number of revolutions in one direction, and means for stopping the motor after it has turned a predetermined extent in the other direction, the control means on that side of said diaphragm to which pressure fluid is supplied from the side of said restriction in the direction of a cause of relative pressure drop across said restriction being operable responsive to said drop to complete a fluid passage communicating with said main through such side of said control to said selector valve to shift said selector valve to admit pressure fluid from said limit valve means to said motor to actuate said motor to operate said main valve.

13. A pressurized fluid system as claimed in claim 12 in which said selector valve includes a manual handle to position said valve for pressure fluid shift by pressure fluid from said control means to admit limit valve pressure fluid through said selector valve to said motor.

14. A pressurized fluid system as claimed in claim 12 in which said selector valve includes a valve housing and a cylindrical valve element of varying diameters slidable therein, and also includes an adapter to admit control means pressure fluid into said selector valve housing in direction both axially and peripherally of said valve element.

15. In an automatic control, in combination, a diaphragm normally counterpoised between pressure fluid from opposite sides of a restriction in a fluid main and dividing said control into two chambers, and a control means in each chamber, the control means on that side of said diaphragm to which pressure fluid is supplied from the side of said restriction in the direction of a cause of differential pressure change across said restriction being operable responsive to said change to complete a fluid passage communicating with said main through such side of said control.

16. A control as claimed in claim 15 in which said control means includes a control trip having as a part thereof an adjustably, yieldably biased plate of substantially diaphragm area to support said diaphragm as it is moved by excess fluid pressure from one side to opposite side tripping position.

17. A control as claimed in claim 15 in which said control means includes a control trip, said control having reset means in each chamber to reset the trip to close off said fluid passage.

18. In a control automatically operative upon the occurrence of an abnormal fluid pressure differential, apparatus comprising, in combination, a conduit, a valve in said conduit, a tap connected to said conduit on each side of said valve and adjacent thereto, a hollow casing, a flexible diaphragm dividing the interior of said casing into two chambers, each of said chambers being in communication with one of said taps respectively, a common discharge pipe having a separate branch in communication with each of said chambers respectively, a closure member in each of said chambers adapted to close said branches respectively, means to open each of said closure members, latch means in each of said chambers to hold said closure members closed, a movable diaphragm follower positioned in opposed fashion on each side of said diaphragm in proximate but spaced relation thereto, each said follower having an area approximating the area of said diaphragm, means for limiting the limit of inward movement of each of said followers toward said diaphragm, positive means for limiting the outward movement of each of said followers when pressed by said diaphragm, means for predetermining the extent of resistance to outward movement of each of said followers, and means to unlatch said latch means in that chamber in which one of said followers moves outwardly a predetermined distance to open said closure member in that chamber upon the occurrence of an abnormal drop in pressure in that chamber relative to the pressure in the other chamber, whereby fluid entering said chamber with the opened branch will flow out through said branch to operate said valve.

19. In a control automatically operative upon the occurrence of an excessive fluid pressure differential, apparatus comprising, in combination, a conduit, an orifice in said conduit through which fluid is adapted to flow in normal quantities, a tap connected to said conduit on each side of said orifice and adjacent thereto, a hollow casing, a flexible diaphragm in said casing, said casing on each side of said diaphragm being in respective communication with said taps, a discharge line in communication with said casing on at least one side of said diaphragm, a closure member in said casing for said discharge line, means to hold said closure member closed, means engageable by said diaphragm to operate said last-named means when said side having said discharge line suffers an excessive pressure drop communicated through its respective tap and open said closure member and discharge line, whereby fluid will pass through said discharge line to actuate corrective control action.

20. In an automatic control system for fluid pipelines operative upon the occurrence of an excessive fluid pressure differential, apparatus comprising, in combination, a conduit through which fluid is adapted to flow, a paralleling conduit, spaced cross connections between said conduit and said paralleling conduit, cross connection valves in said respective cross connections, a control mechanism connected across each of said last-mentioned valves, a flexible diaphragm in each of said mechanisms having its sides respectively subject to the fluid pressure on each side of each of said valves, a normally closed discharge line communicating with at least one side in each of said mechanisms, means to open the discharge line on that side of each of said mechanisms when an excessive pressure drop occurs in the direction of that side, a valve operator for each of said valves, said discharge lines from each of said mechanisms being connected to the respective one of said valve operators to operate the same to close said valves upon the occurrence of any excessive pressure drop in said cross connections, whereby said conduit and paralleling conduit may be isolated from one another in the event of a break in either.

21. A pressurized fluid system including a pair of conduits through which fluid flows under pressure, at least one cross-connecting line extending between said conduits, a restriction in said line, at least one valve in said system proximate to said restriction to control flow from one conduit through said line to the other conduit, a pressure fluid actuated valve operator for said valve, a control responsive to an abnormal velocity head increase across said restriction in the direction of said other conduit to actuate said valve operator to close said valve to isolate said other conduit against flow thereinto from said one conduit and line, said control including a diaphragm directly and immediately subject on its respective sides to fluid pressure from the respective sides of said restriction, said control having a chamber, a normally closed fluid passage operatively connecting said chamber and valve operator, and snap-opening control means in said chamber on the side of said diaphragm subject to fluid pressures from said other conduit, said snap-opening control means being operable, responsive to a pressure drop on said last-named side of said conduit caused by said abnormal velocity head increase, to open said fluid passage to actuate said valve operator to operate and close said valve.

22. In a control, in combination, a housing having two sections, a diaphragm bound between said sections to divide the interior of said housing into two fluid chambers, a separate supply passage for admission of pressurized fluid into each chamber to place said diaphragm in normally counterpoised position, a discharge passage from at least one said chamber, a control means for said discharge passage comprising a valve closure therefor, trip means in said one chamber operatively associated with said valve closure to open it in response to a drop in pressure in the supply passage to said one said chamber having said discharge passage leading therefrom, means to restrain said trip means from tripping said valve closure open, and means operatively associated with said diaphragm upon the movement thereof away from said normally counterpoised position to remove said restraining means to release said trip means to trip the valve closure in said one said chamber supplied by said last-mentioned supply passage upon occurrence of said drop.

23. A control as claimed in claim 22 in which at least one of said housing sections has a plurality of concentric grooves therein outwardly of said chambers to bind the rim of said diaphragm against likelihood of rupture by excess fluid pressures.

24. A control as claimed in claim 22 in which said means to trip includes an adjustably, yieldably biased plate of substantially diaphragm area in said chamber having said discharge passage to be engaged by said diaphragm as said diaphragm is moved by excess fluid pressure toward said plate and into such engagement, and a stop means in the housing section having said plate to restrain said plate against excess movement.

25. A control as claimed in claim 22 which includes a reset member in said one said chamber having said discharge passage to reset said means to restrain said trip means therein after said diaphragm has returned to its initial normally counterpoised position between pressure fluid in said chambers.

26. A control as claimed in claim 22 in which the inner end of said discharge passage comprises a valve seat, said valve closure normally closes said seat and the opening into said discharge passage, said valve closure further is movable, means for normally holding said valve closure in closed position against a bias tending to open said valve closure, and having latch means in said means to trip responsive to unlatching pressure generated by movement of said diaphragm into said chamber having said discharge passage upon the occurrence of an abnormally lowered pressure in said last-named chamber relative to the normal pressure difference between said chambers.

27. In an automatic control, in combination, a diaphragm normally counterpoised between pressure fluid from opposite sides of a restriction in a fluid main and dividing said control into two chambers, a control means in at least one chamber having a fluid passage connected thereto, said control means further comprising a normally closed quick-opening and seated closure for said fluid passage and latch means therefor, said closure being biased toward open position and said latch means being adapted to retain said closure in its closed position until released, said control means being responsive to a pressure drop on that side of said diaphragm connected to said one chamber to cause said diaphragm to move quickly toward said one chamber to release said latch means and unseat said closure to open said fluid passage and operate said control.

28. A control as claimed in claim 27 in which said latch means is resettable and said control further comprises reset means operable from the outside of said one chamber to reset said closure and catch means to close said fluid passage.

29. A pressurized fluid system having a main with a valve therein providing a restriction, taps across said restriction and a valve operator to operate said valve, comprising, in combination, a control having a diaphragm the opposite sides of which are operatively connected to said taps respectively and normally subjected to the pressure of fluid passing through said main on opposite sides of said valve restriction, control means in said control for at least one side of said diaphragm, said control means being arranged to respond to an abnormally lowered pressure on that side due to an abnormal pressure drop across said restriction tending to cause said diaphragm to move an abnormal distance toward said one side thereof, said control means including on said one side of said diaphragm a normally closed fluid passage leading to said valve operator, and means in said control means responsive to any said abnormally lowered pressure to open said fluid passage to operate said valve operator and thereby said valve.

30. A pressurized fluid system comprising, in combination, first and second conduits and a cross-connecting line between said conduits, a first valve providing a restriction in said first conduit on the upstream side of said line, a second valve providing a restriction in said line, a control comprising a casing having a diaphragm dividing said casing into two chambers respectively subject to the fluid pressure across said restriction in said line in the portions thereof nearer and farther respectively from said first conduit, a first and second valve operator respectively adapted to operate said first and second valves, openable closure means in each chamber responsive to an abnormally lowered pressure in said chambers within which they are located respectively due to an abnormal pressure drop across said restriction in said line in either direction, one of said chambers being operatively subject to the pressure in said nearer portion of said line and the other to the pressure in said farther portion, said one of said chambers also being operatively connected to said first and second valve operators through its associated closure means and the other of said chambers being operatively connected to said second valve operator through its associated closure means but not to said first valve operator, whereby a break downstream of said first valve or in said nearer portion of said line will operate said first and second valve operators to close both said first and second valves, whereas a break in said farther portion of said line or second conduit will operate said second valve operator to close said second valve but not said first valve.

References Cited in the file of this patent

UNITED STATES PATENTS

| Number | Name | Date |
|---|---|---|
| 1,956,009 | Diescher | Apr. 24, 1934 |
| 2,160,766 | Thomason | May 30, 1939 |
| 2,196,279 | Thomas | Apr. 9, 1940 |
| 2,234,798 | Craig | Mar. 11, 1941 |
| 2,266,533 | Brisbane | Dec. 16, 1941 |
| 2,525,487 | Johnson | Oct. 10, 1950 |
| 2,566,773 | Otis | Sept. 4, 1951 |
| 2,613,683 | Baird | Oct. 14, 1952 |
| 2,659,565 | Johnson | Nov. 17, 1953 |
| 2,667,887 | Hoffacker | Feb. 2, 1954 |
| 2,707,481 | McPherson | May 3, 1955 |
| 2,707,483 | Shafer | May 3, 1955 |
| 2,736,332 | Simmons | Feb. 28, 1956 |
| 2,763,286 | Wilson | Sept. 18, 1956 |
| 2,836,192 | Shafer | May 27, 1958 |
| 2,861,587 | Hursen | Nov. 25, 1958 |

FOREIGN PATENTS

| Number | Country | Date |
|---|---|---|
| 320,163 | Germany | Apr. 12, 1920 |
| 482,935 | Great Britain | Apr. 7, 1938 |

UNITED STATES PATENT OFFICE
CERTIFICATE OF CORRECTION

Patent No. 3,131,714                      May 5, 1964

Lynn T. Elliott et al.

It is hereby certified that error appears in the above numbered patent requiring correction and that the said Letters Patent should read as corrected below.

Column 4, line 38, after "on" insert -- latch --; column 6, line 35, after "not" insert -- only --; column 7, line 53, for "exhaused" read -- exhausted --; column 15, line 21, for "pressure" read -- pressures --.

Signed and sealed this 15th day of September 1964.

(SEAL)
Attest:

ERNEST W. SWIDER
Attesting Officer

EDWARD J. BRENNER
Commissioner of Patents